(12) United States Patent
Shires

(10) Patent No.: US 12,198,728 B2
(45) Date of Patent: Jan. 14, 2025

(54) VIDEO EDITING SYSTEM

(71) Applicant: Pixxy Video Solutions, Inc., Los Angeles, CA (US)

(72) Inventor: Claude Shires, Los Angeles, CA (US)

( * ) Notice: Subject to any disclaimer, the term of this patent is extended or adjusted under 35 U.S.C. 154(b) by 68 days.

(21) Appl. No.: 18/006,539

(22) PCT Filed: Jul. 22, 2021

(86) PCT No.: PCT/US2021/042850
§ 371 (c)(1),
(2) Date: Jan. 23, 2023

(87) PCT Pub. No.: WO2022/020649
PCT Pub. Date: Jan. 27, 2022

(65) Prior Publication Data
US 2023/0260550 A1    Aug. 17, 2023

Related U.S. Application Data

(60) Provisional application No. 63/056,392, filed on Jul. 24, 2020.

(51) Int. Cl.
*G11B 27/00* (2006.01)
*G11B 27/031* (2006.01)
(Continued)

(52) U.S. Cl.
CPC ..... *G11B 27/031* (2013.01); *H04N 21/21805* (2013.01); *H04N 21/23106* (2013.01); *H04N 21/8358* (2013.01); *H04N 21/854* (2013.01)

(58) Field of Classification Search
CPC ....... G11B 27/031; G11B 27/00; G11B 27/02; H04N 21/21805; H04N 21/2187;
(Continued)

(56) References Cited

U.S. PATENT DOCUMENTS 5,448,307 A    9/1995  Gelissen et al.
2003/0193616 A1*  10/2003  Baker .............. H04N 21/23892
                                                348/E7.086
(Continued)

OTHER PUBLICATIONS

World Intellectual Propety Organization International Bureau, International Search Report and Written Opinion for PCT/US2021/42850, Nov. 3, 2021, 16 pages.

*Primary Examiner* — Daquan Zhao
(74) *Attorney, Agent, or Firm* — Cislo & Thomas, LLP

(57) ABSTRACT

A system and method for generating a multi-source video to expedite video editing are disclosed. An exemplary system comprises a video switch (234) configured to (a) receive a plurality of video streams (232), each video stream associated with one of a plurality of cameras (120A-120C); and (b) select at least one portion of video from each of the plurality of video streams; a source identifier mapping module (238) configured to generate a plurality of source identifiers (370-372), each source identifier associated with one of the plurality of video streams; a video watermarking module (240) configured to: (a) embed, for each selected portion of video, one of the plurality of source identifiers in the portion of video (350-352); wherein the source identifier embedded in each selected portion of video corresponds to the video stream from which the portion of video was received; and (b) generate a multi-source video (242) comprising the selected portions of video with embedded source identifier; and a video editing processor (150) configured to pre-cache the selected portions of video based on the multi-source video and embedded source identifiers.

14 Claims, 7 Drawing Sheets

(51) Int. Cl.
*H04N 21/218* (2011.01)
*H04N 21/231* (2011.01)
*H04N 21/8358* (2011.01)
*H04N 21/854* (2011.01)
*G11B 27/02* (2006.01)

(58) Field of Classification Search
CPC ....... H04N 21/23106; H04N 21/23418; H04N 21/23424; H04N 21/8358; H04N 21/854; H04N 5/77; H04N 9/8205
USPC ....... 386/278, 280, 282, 284, 239, 252, 260, 386/241
See application file for complete search history.

(56) References Cited

U.S. PATENT DOCUMENTS

| | | | |
|---|---|---|---|
| 2007/0201815 A1* | 8/2007 | Griffin | G11B 27/10 386/234 |
| 2014/0111603 A1 | 4/2014 | Khan et al. | |
| 2015/0037004 A1 | 2/2015 | Minder | |
| 2019/0267041 A1 | 8/2019 | Ricciardi | |

* cited by examiner

VIDEO EDITING SYSTEM

INCORPORATION BY REFERENCE TO ANY PRIORITY APPLICATIONS

This PCT application claims priority to U.S. Provisional Patent Application No. 63/056,392, titled "Video Content Analysis and Production Edit Recreation System," filed Jul. 24, 2020, the contents of which are incorporated by reference herein in their entirety.

BACKGROUND

Field

The present disclosure relates to systems and techniques for video analysis. More specifically, this disclosure relates to techniques for generating a production video and video editing system.

Description of Related Art

Recording live performances, e.g., comedy shows, concerts, sporting events, etc., typically require a complex multi-camera set up. For example, a live performance may have numerous cameras positioned about a venue at which entertainers or athletes are performing. The cameras are generally positioned at specific locations from the entertainers and those cameras focused on specific aspects of the performance. The video from the cameras are then transmitted to a facility in which a live video broadcast is generated.

A director, for example, may generate the live video broadcast by selecting the video feed from among the different cameras at any given moment of time. The director may, for example, select the video feed from a first camera for several seconds, cut to the video feed from a second camera for several more seconds, and switch to the video feed from a third camera for another period of time. The resulting live video broadcast is therefore a combination of videos from the plurality of different cameras. The live video broadcast may therefore capture the live performance from the different positions while focusing attention on the most relevant events occurring during the performance.

Another video of the performance may be made offline after the performance has ended. Although similar to the live video broadcast, this post-performance version of the video may be used to alter, revise, or otherwise improve the video for another audience. The process of generating the improved version during post-performance is generally very time consuming. There is therefore a need for a technique to improve the speed and efficiency with which the post-performance video is generated.

SUMMARY

The preferred embodiment of the present invention features a novel system and method of generating a multi-source video to expedite video editing while still being suitable for distribution/broadcast. The method comprises: receiving a plurality of video streams, each video stream associated with one of a plurality of cameras filming a live event, for example; generating a plurality of source identifiers, each source identifier associated with one of the plurality of video streams; selecting, via a video switch, at least one portion of video from each of the plurality of video streams; embedding, for each selected portion of video, one of the plurality of source identifiers in the portion of video; wherein the source identifier embedded in each selected portion of video corresponds to the video stream from which the portion of video was received; generating a multi-source video comprising the selected portions of video with embedded source identifier; and causing the multi-source video to pre-cache the selected portions of video based on the embedded source identifiers. Pre-caching includes importing the multi-source video with embedded source identifiers into an editing program; reading the plurality of source identifiers embedded in the multi-source video with the editing program; and automatically retrieving, using the editing program, the portions of video from each of the plurality of video streams based on the embedded source identifiers.

The source identifiers are embedded in a predetermined pixel in each frame of the multi-source video. The source identifiers correspond to different colors of the pixel, each color associated with a different video stream. These video streams are generally live video of various events including live music events, sporting events, theatrical events, comedy events, and even multi-party video conference calls.

The system in the preferred embodiment comprises a video switch configured to (a) receive a plurality of video streams, each video stream associated with one of a plurality of cameras; and (b) select at least one portion of video from each of the plurality of video streams based on input from a director, for example; a source identifier mapping module configured to generate a plurality of source identifiers, each source identifier associated with one of the plurality of video streams; a video watermarking module configured to: (a) embed, for each selected portion of video, one of the plurality of source identifiers in the portion of video; wherein the source identifier embedded in each selected portion of video corresponds to (i.e., associated with) the video stream from which the portion of video was received; and (b) generate a multi-source video comprising the selected portions of video with embedded source identifier; and a video editing processor configured to pre-cache in memory the selected portions of video based on the multi-source video and embedded source identifiers. The source identifier mapping module may be configured to generate a map consisting of a plurality of source identifiers and a plurality of sources of video, wherein the map associates each of the plurality of source identifiers with one of the plurality of sources of video.

BRIEF DESCRIPTION OF DRAWINGS

The present invention is illustrated by way of example and not limitation in the figures of the accompanying drawings, and in which.

DETAILED DESCRIPTION

Figure 1:
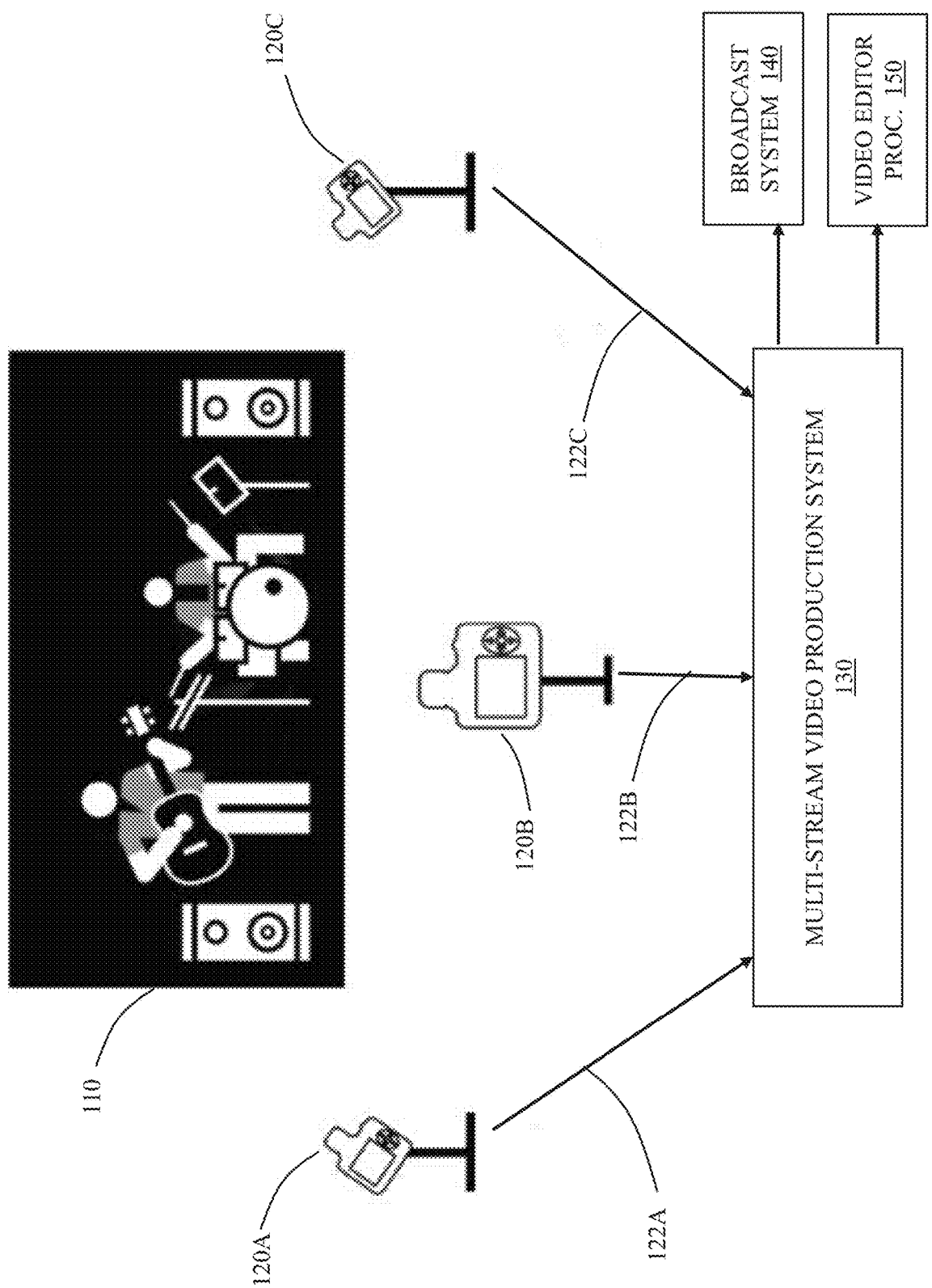
FIG. 1 is a diagrammatic illustration showing an event being recorded by a plurality of video cameras, in accordance with a preferred embodiment.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

This specification describes, among other things, techniques to rapidly generate production videos. For example, the production video may be generated from a multitude of video streams from respective cameras in a multi-camera set up. In this example, the multi-camera set up may be positioned to capture a live show, live event, live conference call, etc. As will be described, during the live show or event, a person may switch between these cameras to generate a live video sometimes called a line cut video. This line cut video may represent an initial determination by the person as to the filming or recording of the live show or event. For example, the person may use hardware and/or software configured to receive numerous video streams and select one video stream from among those video streams using a switch. Whichever video stream is selected at any given moment is incorporated into the live video. The system may then output a video stream that includes the live video currently selected person.

As is known in the art, this live video may be revised and improved at a later time for distribution over network television or cable, for example. This post-performance version may have adjustments as compared to the live video. It may be determined, for example, that portions of video in the live video should be replaced with video footage from a different vantage point or with different content. When modifying the video of a live concert, for example, portions of the original live video depicting the whole band may be replaced with video footage of individual band members.

Prior techniques for editing or otherwise revising the live video relied upon manual identification of each portion of the live video as well as the camera with which it was generated. This identification is generally tedious and very time-consuming. There is therefore a need for a technique to reduce the time and effort needed to generally revise and/or refine a live video into a high-quality post-performance video.

As will be described in more detail below, the present invention streamlines the editing process and dramatically reduces the preparation needed to produce the video revisions. In brief, the preferred embodiment of the present invention encodes each portion of video in the live video with a identifying information associated with its source. That is, each camera utilized to record a live show or event may be associated with an identifier unique to the camera or the video stream generated by the camera. In some embodiments, this identifier comprises visual information in the form of a certain color and that color encoded into a pixel in one or more frames of video from the camera that captured it. In some embodiments, this pixel may be added by a system or software tool which receives a video stream from the camera. Optionally, the pixel may be positioned at a certain position within each image frame outputted by the camera.

Illustrated in FIG. 1 is a diagrammatic illustration showing a live event being recorded by a plurality of video cameras. In this example, the event is a concert performed live on stage by a band 110. The concert is being recorded by a plurality of cameras 120A-120C are distributed around the venue to captured different aspects of the performance and from different angles. For example, camera 120A is positioned at the left side of FIG. 1 (i.e., stage right) to focus on the guitarist, camera 120C positioned at the right side of FIG. 1 (i.e., stage left) to focus on the drummer, and camera 120B positioned therebetween to capture the band in wide angle. These cameras 120A-120C may simultaneously obtain videos of the concert in a synchronized manner. The videos, referred to herein as video streams, are transmitted in real-time to a central location where they are combined to make a live video. In the preferred embodiment, the cameras 120A-120C are conventional television cameras or cinema cameras. In other embodiments, the plurality of cameras 120A-120C include mobile phones or other wireless camera devices that are interconnected and capture video in a synchronized setting.

In the preferred embodiment, the video streams captured by the plurality of cameras 120A-120C are transmitted by wired or wireless connection to a multi-stream video production (MSVP) system 130 where they are used to produce a multi-camera production video, also referred to here in as a line-cut. The production video is a single video consisting of a portion(s) of the video stream from each of the plurality of cameras 120A-120C.

In the preferred embodiment, the MSVP system 130 generates the production video from the video streams 122A-122C from the cameras 120A-120C, respectively, in real time. Portions of video, i.e., video clips, are selected from the video streams 122A-122C by a director, for example, and those portions concatenated or otherwise combined in real time. In some cases, the production video or line cut is transmitted in real time to people around the country or world by means of a broadcast system 140. The broadcast system 140 may include conventional radio frequency broadcasts, cable television broadcasts, and/or data network transmission via the Internet, for example.

In accordance with the preferred embodiment, the MSVP system 130 is also configured to generate a second version of the production video with watermarks. Watermarks are used to encode the source of each portion/clip of video in the production video. In the preferred embodiment, each portion of video comprises a plurality of pixels representing the red, green, blue (RGB) colors of an image, and each watermark consists of a single pixel with a numerical value identifying one of the plurality of video streams (or the camera that generated the video stream). The production video with watermarks is then transmitted to a video editing processor 150 where the portions of video are edited into a post-performance video, described in more detail below.

Figure 2:
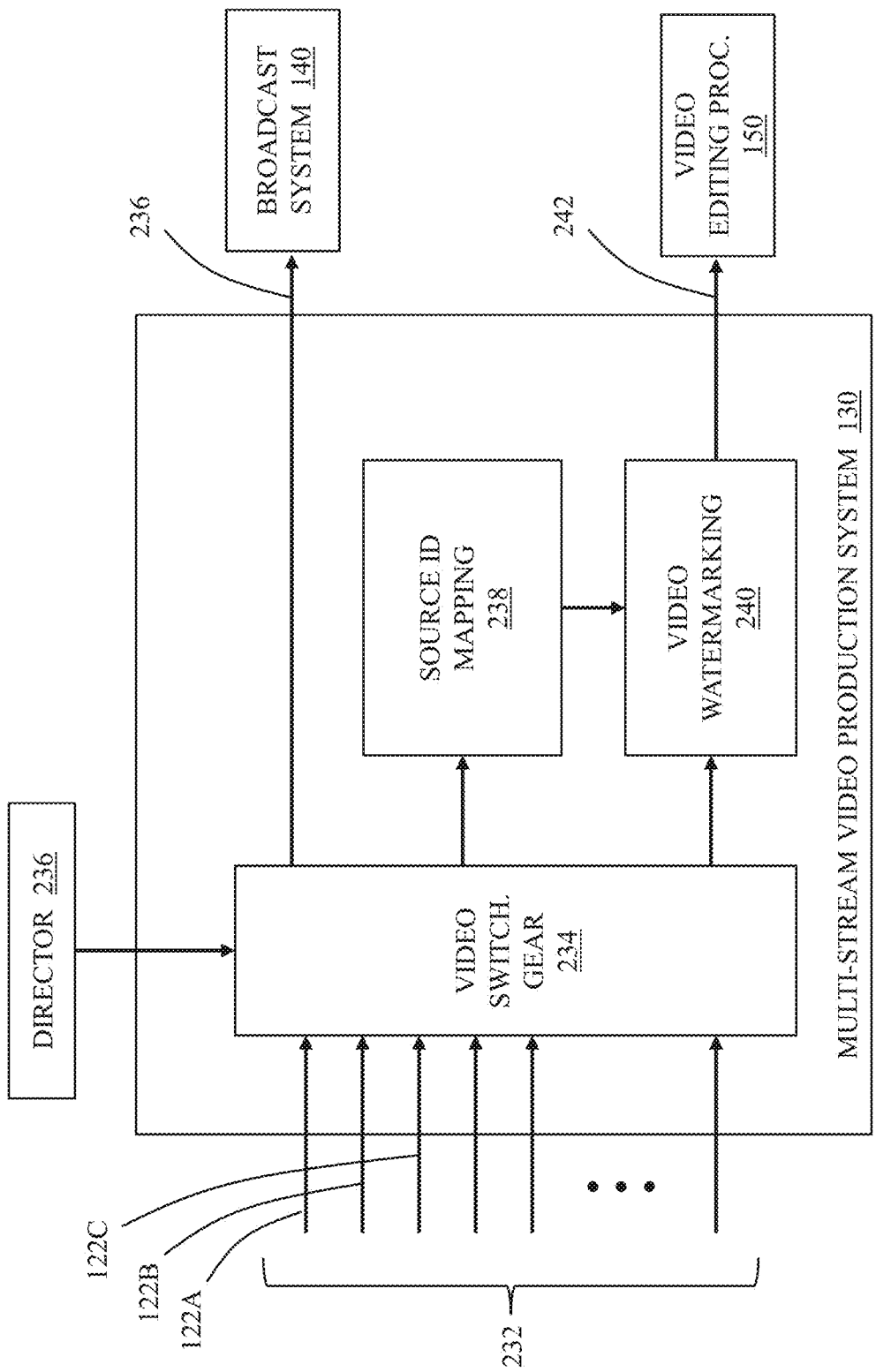
FIG. 2 is functional block diagram of a multi-stream video production system, in accordance with a preferred embodiment.

Illustrated in FIG. 2 is a functional block diagram of the multi-stream video production (MSVP) system 130 in the preferred embodiment. The MSVP system 130 includes video switching gear 234 operated by a director 236, a stream identifier mapping module 238, and a video watermarking module 240. The video switch gear 234 is configured to concurrently receive a video stream 232 from each of the plurality of cameras 120A-120C. In the preferred embodiment, there are three cameras 120A-120C and therefore three video streams 122A-122C. In other embodiments, however, the set of cameras can number in the tens or even hundreds of cameras, each producing a single video stream.

Figure 3A:
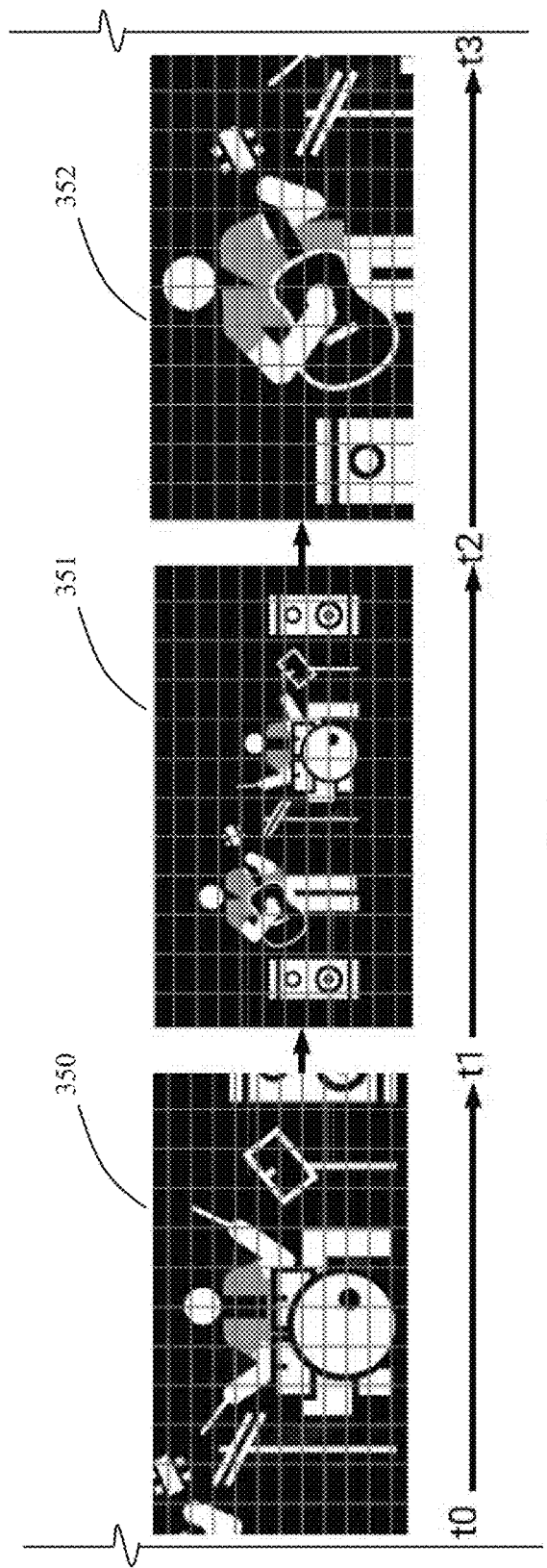
FIG. 3 is a segment of the production video from time t0 to time t3, in accordance with a preferred embodiment.

The director 236 operates the video switching gear 234 to select each portion of video from the plurality of video streams 232 and those videos incorporated into the production video. Illustrated in FIG. 3A is a segment of the production video from time t0 to time t3. This segment of production video includes: a first portion 350 of video from video stream 122C depicting the drummer, a second portion 351 of video from the video stream 122B depicting the band, and a third portion 352 of video from the video stream 122A depicting the guitarist. The first portion 350 of video runs from time t0 to t1, the second portion 351 of video runs from time t1 to t2, and the third portion 352 of video runs from time t2 to t3. Each portion of video 350-352 was selected by the director 236 from the plurality of video streams 232 and those portions transmitted for broadcast in the sequence shown. In this way, the director or other user may produce a live show according to his/her artistic vision.

Referring to FIG. 2 again, the portions of video selected by the director 236 are combined in a sequential manner to produce the production video 236, i.e., the line cut video, for broadcast to the public. In addition to the production video, the MSVP system 130 is configured to generate a second production video 242 with watermarks, and that version uploaded or otherwise transmitted to the video editing processor 150 during post production.

In accordance with the preferred embodiment, the MSVP system 130 also includes a source identifier (ID) mapping module 238 configured to identify the video stream from which the production video is being generated at any given moment in time. That is to say, the source ID mapping module 238 is configured to identify the camera from which a video clip is acquired at any given moment in time. The identifier associated with the video source is then embedded into a pixel in the form a watermark. The identifier in the preferred embodiment is a numerical value that is assigned to a designated pixel predetermined by the MSVP system 130 or assigned by an operator, for example. The particular pixel used as a watermark is visible upon inspection of the video while still being largely invisible to a person viewing the production video with the watermark.

In the preferred embodiment, the source identifier mapping module 238 is configured to identify the camera producing the video stream based on input from the switching gear 234. When the switching gear 234 is configured to select one of the plurality of video streams 232, that selection is communicated by the switching gear 234 to the source identifier mapping module 238. The source identifier mapping module 238 then retrieves the source identifier associated with the selected video stream.

In the preferred embodiment, the source identifier is a numerical value that, when assigned to the designated ID pixel, causes the pixel to have a particular color. The particular color may be a color defined according to a particular color model (e.g., RGB) and/or a particular color standard (e.g., DCI-P3). It may be appreciated that a color model such as in RGB uses a predefined number of bits (e.g., 8 bit, 16 bits) to encode the intensity of red, green, and blue exhibited by the pixel. As such, the particular color used to identify a source may be selected from among millions (e.g., with 8 bits per color channel) or trillions (e.g., with 16 bits per color channel) of colors.

The MSVP system 130 in the preferred embodiment further includes a video watermarking module 240 configured to assign to the designated pixel the particular color associated with the selected video stream. The designated pixel, referred to herein as the identifier (ID) pixel, is embedded in the portion of video being added to the second production video, i.e., the version with watermarks. The color assigned to the ID pixel then changes based on the source of the video clip. The source of video clip may therefore be identified in the line cut based on frames of the line cut including the particular color at the ID pixel.

Figure 3B:
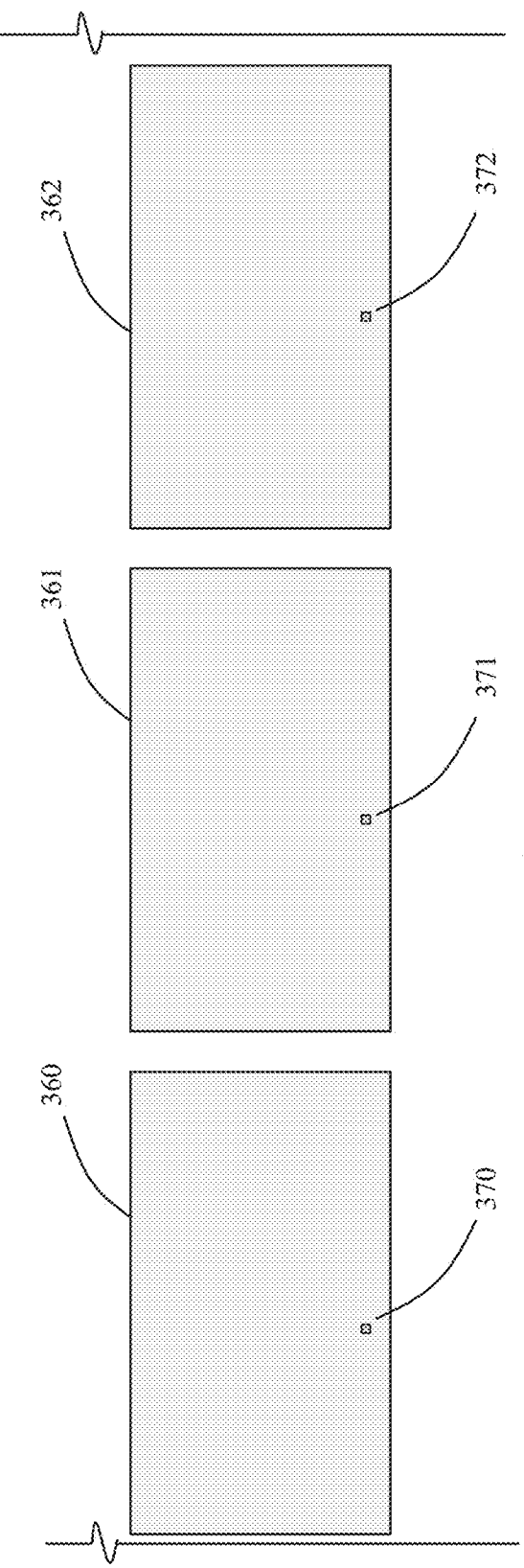

Referring to FIG. 3B, the ID pixel is a single pixel in each frame of the second production video. For example, the ID pixel 370 in a frame 360 identifies the source of the portion of video 350. The identifier is encoded in the value, i.e., color, of the ID pixel, which is unique to the video stream from which the portion of video 350 was acquired. In the preferred embodiment, the ID pixel 370 is embedded in at least one—and preferably all—frames 360 of the portion of video 350.

When the director changes the source of video for the production video, a different color that is unique to the second stream 351 is assigned to the ID pixel 371. The ID pixel is then embedded in each frame 361 of that portion of video 351. When the director changes the source of video for the production video again, another color that is unique to a third stream 352 is assigned to the ID pixel 372 and that pixel embedded in the frames 362 of the portion of video 352.

Since each camera 120A-120C may be separately identified with ID pixel, the source of every frame of the line cut video 242 (see FIG. 2) can be identified and traced back to one of the camera 120A-120C. At the end of the concert, the production video 242 with watermarks is then transmitted to a video editing processor 150 for purposes of generating a post-performance video.

Figure 4:
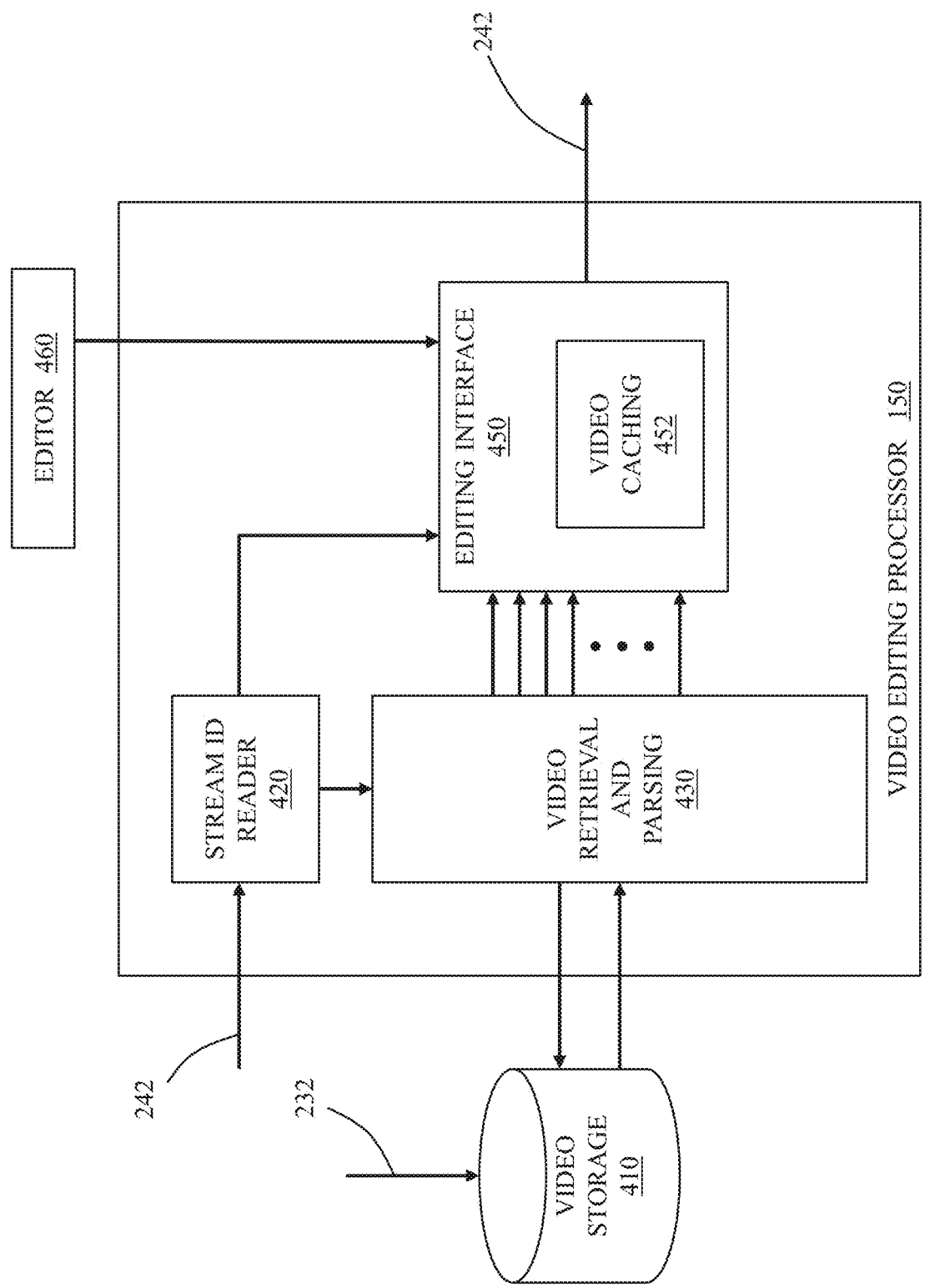
FIG. 4 is a plurality of video frames with embedded ID pixels, in accordance with a preferred embodiment.

Referring to FIG. 4, the invention in some embodiments further includes a video editing processor 150 with memory configured to pre-cache portions of the video streams 232 based on the source stream identifiers embedded in the ID pixels. Pre-caching portions of video in memory enables the video editing processor 150 to automatically prepare the video for a post-performance editing with little or no manual intervention. As one skilled in the art will appreciate, editing systems in the prior art require manual selection and loading of the portions of video, which often require roughly 40 to 80 hours of work on the part of the editor. The present invention therefore increases productivity and reduces costs associated with making a post-performance video of the live event.

The video editing processor 150 in the preferred embodiment includes a stream ID reader 420, a video retrieval and parsing (VRP) module 430, and an editing interface 450. The video editing processor 150 is also operably coupled to a video storage device 410, cloud, or other memory device. After the live performance is complete and the video streams acquired, the video from the plurality of cameras 120A-120C is stored in the form of video files in the video storage device 410 where it is available to the video editing processor 150 as well as the editor 460 in charge of making a post-performance video of the live event. The post-performance video is generally similar to, but different than, the production video. In generally, the post-performance is used to select different camera angles and alternate video footage to produce a higher-quality video than that of the original production video generated in real time.

In preparation for editing, and before the start of editing, the video editing processor 150 inputs a copy of the production video with watermarks 242. As described above, the production video with watermarks 242 comprises portions of video from the video streams 232 generated by the cameras 120A-120C as well as watermarks, i.e., identifiers encoded in the ID pixels. The stream ID reader 420 proceeds to read the color of the ID pixel in each frame of the production video with watermarks 242. Each color, or more precisely, the numerical value of the color, is associated with a particular video stream generated by one of the plurality of cameras 120A-120C. Each color is then used to identify the camera/stream corresponding to the color. The camera/stream for each portion of video of the transmitted to the video retrieval and parsing (VRP) module 430.

In some embodiments, the stream ID reader 420 also transmits timestamps or start/end times of the portion of video to the VRP module 430. Referring back to FIG. 3A-3B, for example, the stream ID reader 420 may output the ID of the camera that acquired the first video portion 350 as wells as the time t0 and time t1. Similarly, the stream ID reader 420 may output the ID of the camera that acquired the second video portion 351 as wells as the time t1 and time t2. Thereafter, the stream ID reader 420 may output the ID of the camera that acquired the first video portion 352 as wells as the time t1 and time t2.

Upon receipt of the source stream IDs and times (t0, t1, t2, t3, etc.), the VRP module 430 is configured to retrieve the portions of video from the original video files stored in memory 410. Referring back to FIG. 3A-3B, for example, the VRP module 430 is configured to retrieve the original video corresponding to: the first video portion 350 between the time t0 and time t1, the second video portion 351 between time t1 and time t2, and the third video portion 352 from time t2 to time t3. These portions of video correspond to the original video without the ID pixel.

These portions of video retrieved by the VRP module 430 are then uploaded in the video editing processor and presented to an editor 460 (a person) in the editing interface 450. The portions of video are therefore pre-cached in the video caching module 542, thus making them available to the editor 460 with little or no manual effort by the editor 460.

In some embodiments, the functionality described herein may be implemented by means of a comprehensive software program. In other embodiments, the functionality is achieved using, for example, a plugin or module to a third-party video editing platform (e.g., Final Cut Pro, etc.). For example, the plugin or module may obtain video streams and generate a production video within the video editing platform. In this way, an editor may avoid the tedious task of uploading data and recreating the live edit as a production edit within his/her preferred editing platform.

Figure 5:
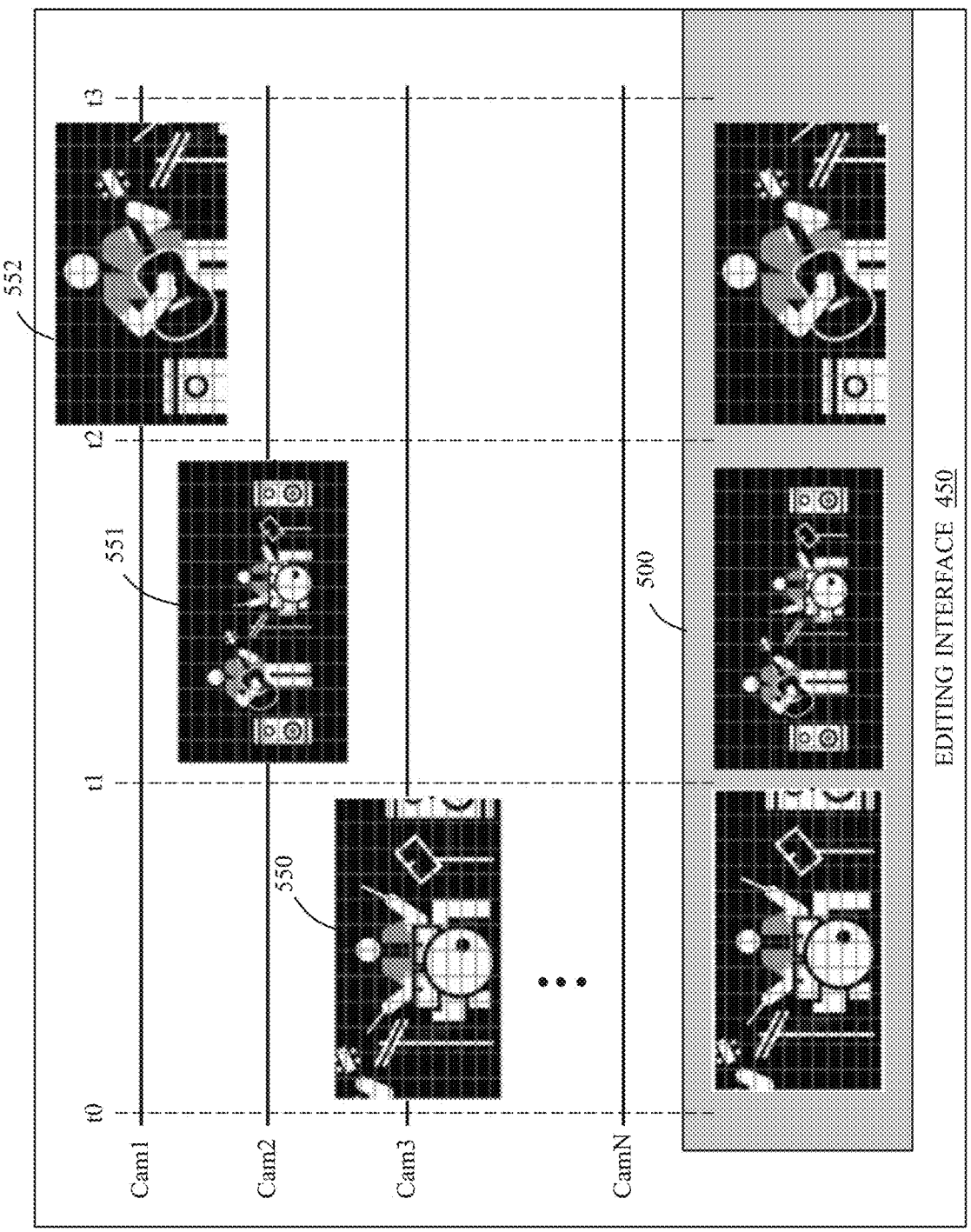
FIG. 5 is a functional block diagram of a video editing processor, in accordance with a preferred embodiment.

A diagrammatic illustration of the editing interface 450 with pre-cached video is shown in FIG. 5. The interface 450 includes a first portion of video 550 from camera 120C, a second portion of video 551 from camera 120B, and a third portion of video 552 from camera 120A. The portions of video 550-552 are organized within separate rows, each row corresponding to a different source. The portions of video 550-552 are also organized across different columns, each column corresponding to a different portions of the timeline. As shown, the three columns correspond to temporal boundaries, including t0, t1, t2, and t3, for example.

Being an editing interface, the temporal boundaries can be modified to increase or decrease, i.e., trim, the temporal width of the portion of video. If and when the temporal boundaries are increased, the video editing processor 150 retrieves the required video data from memory 410 and presents it in the editor interface 450. The portions of video, when concatenated, yield a new post-performance video.

The post-performance video 242, when completed, is provided as output to the broadcasting system 140, for example.

Figure 6:
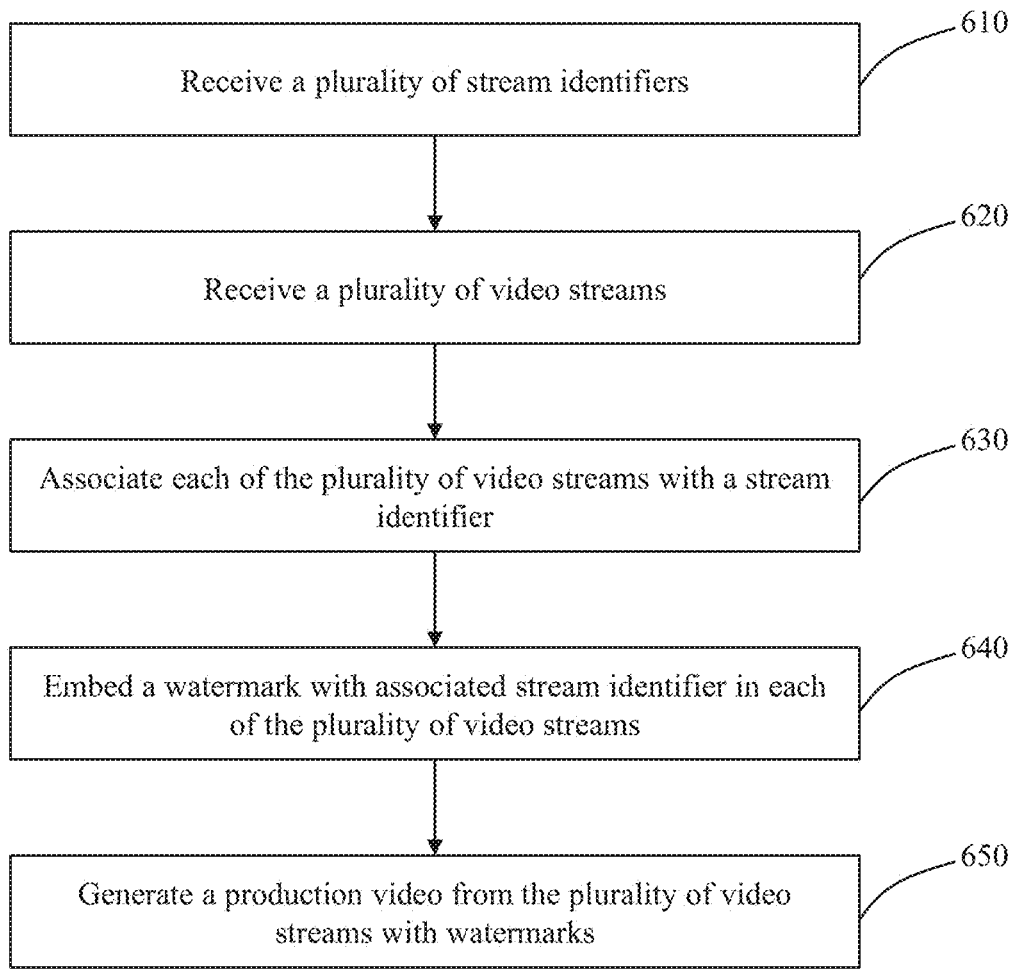
FIG. 6 is a flowchart of the process of generating a production video with watermarks, in accordance with a preferred embodiment.

Illustrated in FIG. 6 is a flowchart of the process of generating a production video with a plurality of watermarks. To start, the multi-stream video production system 130 either generates a plurality of source identifiers, or receives 610 the assigned identifiers from the user, for example. Each source identifier, i.e., stream identifier, is associated with a single video stream, each video stream generated by a different one of a plurality of video cameras 120A-120C. This step generally occurs prior to the start of the live event for which the production video is being generated.

At the start of the live event, the multi-stream video production system 130 begins receiving 620 a plurality of video streams, each video stream corresponding to one of a plurality of video cameras 120A-120C. Each video stream is associated 630 with, or otherwise assigned to, one of the unique source identifiers. Thus, there is a one-to-one correspondence between each one of the video streams and an identifier for the stream.

As a director, for example, uses the multi-stream video production system 130 to select one of the plurality of video streams 232, the video watermarking module 240 generates an ID pixels and embeds 640 the ID pixels in portions of video. As stated, each ID pixel corresponds to a watermark in the portion of video in order to identify the video stream or the source of the video stream. In the preferred embodiment, each watermark corresponds to a unique color that is visible upon careful inspection of the second production video, but generally invisible to a casual observer.

The portions of video with watermarks are then concatenated or otherwise combined 650 to yield a second production video with watermarks. At this point, the second production video with watermarks is suitable for distribution to the public in the form of a line cut video, for example. In other embodiments, the watermarks are removed prior to distribution to the public.

Figure 7:
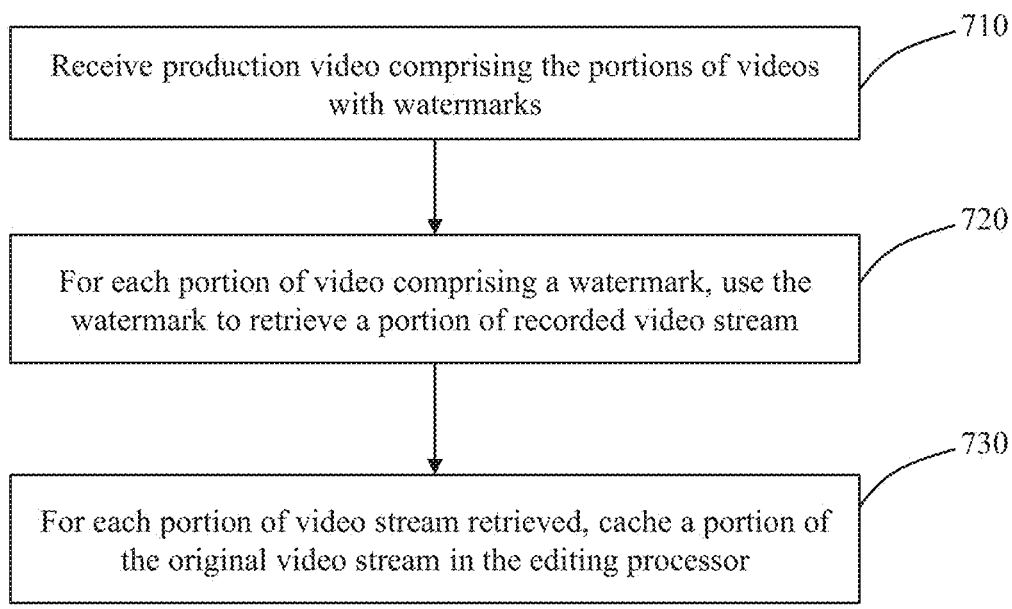
FIG. 7 is a flowchart of the process of pre-caching the production video with watermarks in a video editing processor, in accordance with a preferred embodiment.

Illustrated in FIG. 7 is a flowchart of the process for pre-caching video based on the watermarks. After the live event and creation of the second production video with watermarks, an editor may be tasked with creating a different or better version of the production video. To assist in this process, the video editing processor 150 in the preferred embodiment is configured to pre-cache the portions of video to be edited. To start, the video editing processor 150 receives or uploads 710 the production video with watermarks. For each portion of video comprising a watermark, the video editing processor 150 reads the source identifier from watermark and the identifier then used to retrieve 720 a portion of recorded video stream. The portion of video stream that is retrieved corresponds to the same video source stream identified by the associated watermark. The duration of the portion of video stream retrieved corresponds to the period of time represented in the clip present in the production video with watermarks. That is, if the portion of production video corresponds to a time t1 to time t2, the video editing processor 150 also retrieves a portion of the video stream corresponding to time t1 to time t2.

Each portion of the video stream identified by a watermark is loaded into the video editing processor 150 until all the portions depicted in the production video have been processed. At this point, the video editing processor 150 is complete with pre-cached portions of video used in the original line cut. Thereafter, the editor can use the video editing processor 150 to edit the production video, replace old clips of video with new or different videoclips, filter the segments of video, or modify the temporal arrangement of video segments. As described above, the process of pre-caching the portions of video is executed automatically by the video editing processor 150, thereby saving the user many hours of manual labor.

Additional Embodiments

In some embodiments, the director may select two or more video streams to be played concurrently in the form of a split screen or picture in picture format, for example. The production video with watermarks may therefore include source stream IDs for two video streams. In this embodiment, the pixel ID may include two stream IDs, namely a first stream ID assigned to the red channel and a second stream ID assigned to the green channel in an RGB format, for example.

In some embodiments, the stream IDs are manually assigned to the plurality of video streams. In some other embodiments, the stream IDs are automatically generated by the MSVP system 130 and automatically assigned to the plurality of video cameras 120A-120C after searching and discovering the cameras. In other embodiments, the stream IDs are colors that are randomly generated and then assigned to the respective cameras using a manual or automatic process.

The system in some embodiments, comprising the MSVP system 130 and/or video editing processor 150, may be configured to store a map relating each video stream to the source stream ID in the form of a data file (e.g., XML file, EDL file, JSON file, table of information, or CSV file). In some other embodiments, the stream IDs are embedded in the video files in memory 410 themselves in the form of metadata. This metadata may be written into the video files in memory by the MSVP system 130, and the metadata later read by the video editing processor 150 before retrieving portions of video from which the second production video is created. In another embodiment, the map relating each video stream to the source ID is entered in the video editing processor 150 and recorded in the form of text or binary data in a .DAT file, for example.

In some embodiments, the system may estimate a location of each camera used to record a live show or event. For example, the system may obtain camera parameters for the camera. Example camera parameters may include extrinsic or intrinsic parameters, such as a focal length of a lens, sensor size, lens distortion, and so on. The system can then compare the video streams to estimate possible locations of the cameras. For example, the system may identify corresponding features in the camera streams which are fixed in the real-world. The system may then project these features to determine possible locations within the real-world. Based on these projections the system may determine possible locations for the cameras (e.g., positioned to the left of the live show a certain distance or possible range of distances out).

In some embodiments, the system may use information indicating known sizes of real-world features. For example, the system may use information indicating an average size of a person, an average or known size of speakers, and so on. These sizes may be used to refine the estimated locations. As an example, the system may estimate a depth of a camera from a band member based on an average size of a person, or known size of the band member, along with the focal length used for the camera. This location information may be optionally be presented in a user interface to illustrate which camera is currently being used for a portion of a live or production edit.

This invention may be industrially applied to the development, manufacture, and use of hardware and software that produce digital entertainment products. While the digital entertainment products are generally digital files, the hardware and software required to produce these products are sophisticated tools designed to perform complicated tasks. The present invention extends the state of the art by reducing the manpower needed to produce entertainment products and therefore increasing efficiency.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The system can take the form of an entirely hardware embodiment, an entirely software embodiment or an embodiment containing both hardware and software elements. In one embodiment, the system is implemented in software, which includes but is not limited to firmware, resident software, microcode, etc.

Furthermore, the system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. The internet 20 can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HTML, or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present application could apply in any such interactive communication environments, however, for purposes of discussion, the Web is used as an exemplary interactive hypertext environment with regard to the present application.

A website is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a website elsewhere on the Internet. Each hyperlink is assigned a URL that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer, is a software application program for providing a user interface to the WWW. Upon request from the remote access user via the web browser, the web browser requests the desired hypertext document from the appropriate web server using the URL for the document and the hypertext transport protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, mobile phones, tablets, servers, general purpose computers, special purpose computers, application-specific integrated circuit (ASIC), and digital/analog electronic circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What is claimed is:

1. A method of generating a multi-source video to expedite video editing, the method comprising:
receiving a plurality of video streams, each video stream associated with one of a plurality of cameras;
generating a plurality of source identifiers, each source identifier associated with one of the plurality of video streams;
selecting, via a video switch, at least one portion of video from each of the plurality of video streams;
embedding, for each selected portion of video, one of the plurality of source identifiers in the portion of video; wherein the source identifier embedded in each selected portion of video corresponds to the video stream from which the portion of video was received;
generating a multi-source video comprising the selected portions of video with embedded source identifier; and
causing the multi-source video to pre-cache the selected portions of video based on the embedded source identifiers, wherein each of the plurality of source identifiers is embedded in at least one pixel in the multi-source video, wherein each of the plurality of source identifiers corresponds to a different color of the at least one pixel in the multi-source video.

2. The method of claim 1, wherein the at least one pixel comprises a single pixel having different colors, each color associated with a different video stream.

3. The method of claim 2, wherein the plurality of video streams are live streams.

4. The method of claim 3, wherein the live video streams depict a live music event, sporting event, theatrical event, or comedy event.

5. The method of claim 1, wherein causing the multi-source video to pre-cache the selected portions of video based on the embedded source identifiers comprises:
providing a video editing program;
importing the multi-source video with embedded source identifiers into the editing program;
reading the plurality of source identifiers embedded in the multi-source video with the editing program; and
automatically retrieving, using the editing program, the portions of video from each of the plurality of video streams based on the embedded source identifiers.

6. The method of claim 5, further comprising:
removing the plurality of source identifiers embedded in the multi-source video.

7. The method of claim 6, further comprising:
generating a map consisting of a plurality of source identifiers and a plurality of sources of video, wherein the map associates each of the plurality of source identifiers with one of the plurality of sources of video.

8. A system for generating a multi-source video to expedite video editing, the system comprising:
a video switch configured to:
 a) receive a plurality of video streams, each video stream associated with one of a plurality of cameras; and
 b) select at least one portion of video from each of the plurality of video streams;
a source identifier mapping module configured to generate a plurality of source identifiers, each source identifier associated with one of the plurality of video streams;
a video watermarking module configured to:
 a) embed, for each selected portion of video, one of the plurality of source identifiers in the portion of video; wherein the source identifier embedded in each selected portion of video corresponds to the video stream from which the portion of video was received; and
 b) generate a multi-source video comprising the selected portions of video with embedded source identifier; and
a video editing processor comprising memory configured to pre-cache the selected portions of video in memory based on the multi-source video and embedded source identifiers, wherein each of the plurality of source identifiers is embedded in at least one pixel in the multi-source video, wherein the source identifiers correspond to different colors of the at least one pixel in the multi-source video.

9. The system of claim 8, wherein the at least one pixel consists a single pixel having one of a plurality of different colors, each color associated with a different one of the plurality of video streams.

10. The system of claim 9, wherein the plurality of video streams are live streams.

11. The system of claim 10, wherein the live video streams depicts a live music event, sporting event, theatrical event, or comedy event.

12. The system of claim 8, wherein the video editing processor is further configured to:
import the multi-source video with embedded source identifiers;
read the plurality of source identifiers embedded in the multi-source video; and
automatically retrieve the portions of video from each of the plurality of video streams based on the embedded source identifiers.

13. The system of claim 12, wherein the video editing processor is further configured to:
remove the plurality of source identifiers embedded in the multi-source video.

14. The system of claim 13, wherein the source identifier mapping module is further configured to generate a map consisting of a plurality of source identifiers and a plurality of sources of video, wherein the map associates each of the plurality of source identifiers with one of the plurality of sources of video.

* * * * *